United States Patent
Müller et al.

(10) Patent No.: US 10,534,338 B2
(45) Date of Patent: Jan. 14, 2020

(54) METHOD FOR GENERATING A SWITCHING SEQUENCE IN AN INDUSTRIAL SYSTEM, AND DEVICE

(71) Applicant: Siemens Aktiengesellschaft, München (DE)

(72) Inventors: Andreas Müller, Baiersdorf (DE); Jörn Peschke, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 15 days.

(21) Appl. No.: 15/752,537

(22) PCT Filed: Aug. 20, 2015

(86) PCT No.: PCT/EP2015/069175
§ 371 (c)(1),
(2) Date: Feb. 13, 2018

(87) PCT Pub. No.: WO2017/028931
PCT Pub. Date: Feb. 23, 2017

(65) Prior Publication Data
US 2019/0011893 A1    Jan. 10, 2019

(51) Int. Cl.
*G05B 19/04* (2006.01)
*G05B 19/042* (2006.01)
*G05B 19/418* (2006.01)

(52) U.S. Cl.
CPC ... *G05B 19/0426* (2013.01); *G05B 19/41865* (2013.01); *G05B 2219/23316* (2013.01);*G05B 2219/25387* (2013.01); *G05B 2219/32021* (2013.01); *G05B 2219/34306* (2013.01)
(Continued)

(58) Field of Classification Search
None
See application file for complete search history.

(56) References Cited

U.S. PATENT DOCUMENTS

2006/0064188 A1*  3/2006  Ushiku ............ G05B 19/41865
                                                    700/96
2009/0112350 A1*  4/2009  Yuan ................ G05B 19/41835
                                                    700/117
(Continued)

FOREIGN PATENT DOCUMENTS

CN    101464691 A    6/2009
CN    101714233 A    5/2010
(Continued)

OTHER PUBLICATIONS

Maintaining Knowledge about Temporal intervals; James F. Allen, Research Contributions, Communications of the ACM; vol. 26 No. 11, Nov. 1983.
(Continued)

*Primary Examiner* — Jason Lin
(74) *Attorney, Agent, or Firm* — Henry M. Feiereisen LLC

(57) ABSTRACT

In a method for generating a switching sequence in an industrial plant which includes components for transferring the plant to an energy-saving state, a state model of the plant is used with regard to the components and information about a task-specific action schema with regard to the components. An extended state model is determined by supplementing the state model with the task-specific action schema using circuit-relevant variables. The switching sequence is generated from a start state to a desired target state by calculating proceeding from the target state back to the start state in the extended state model, and the switching sequence is executed.

10 Claims, 4 Drawing Sheets

(56) References Cited

U.S. PATENT DOCUMENTS

| | | | |
|---|---|---|---|
| 2010/0082141 A1 | 4/2010 | Solimano et al. | |
| 2010/0168897 A1 | 7/2010 | August et al. | |
| 2011/0066391 A1* | 3/2011 | AbuAli | G06Q 10/06 702/61 |
| 2013/0218437 A1 | 8/2013 | Gaffney | |
| 2014/0313433 A1 | 10/2014 | Guntermann et al. | |
| 2015/0032230 A1* | 1/2015 | Dallmann | G05B 19/41865 700/12 |
| 2016/0132067 A1 | 5/2016 | Himmler et al. | |

FOREIGN PATENT DOCUMENTS

| | | |
|---|---|---|
| CN | 101761031 A | 6/2010 |
| CN | 101799842 A | 8/2010 |
| CN | WO 2015022268 A1 | 2/2015 |
| EP | 2726945 A1 | 5/2014 |
| EP | 2729845 A1 | 5/2014 |
| EP | 2729853 A1 | 5/2014 |
| EP | 2798418 A1 | 11/2014 |
| EP | 2802947 A1 | 11/2014 |
| WO | WO2009/021540 | 2/2009 |
| WO | WO-2013131556 A1 * | 9/2013 ....... G05B 19/41865 |
| WO | WO 2014040776 A1 | 3/2014 |

OTHER PUBLICATIONS

PCT International Search Report dated Jun. 9, 2016 corresponding to PCT International Application No. PCT/EP2015/069175 filed Aug. 20, 2015.

* cited by examiner

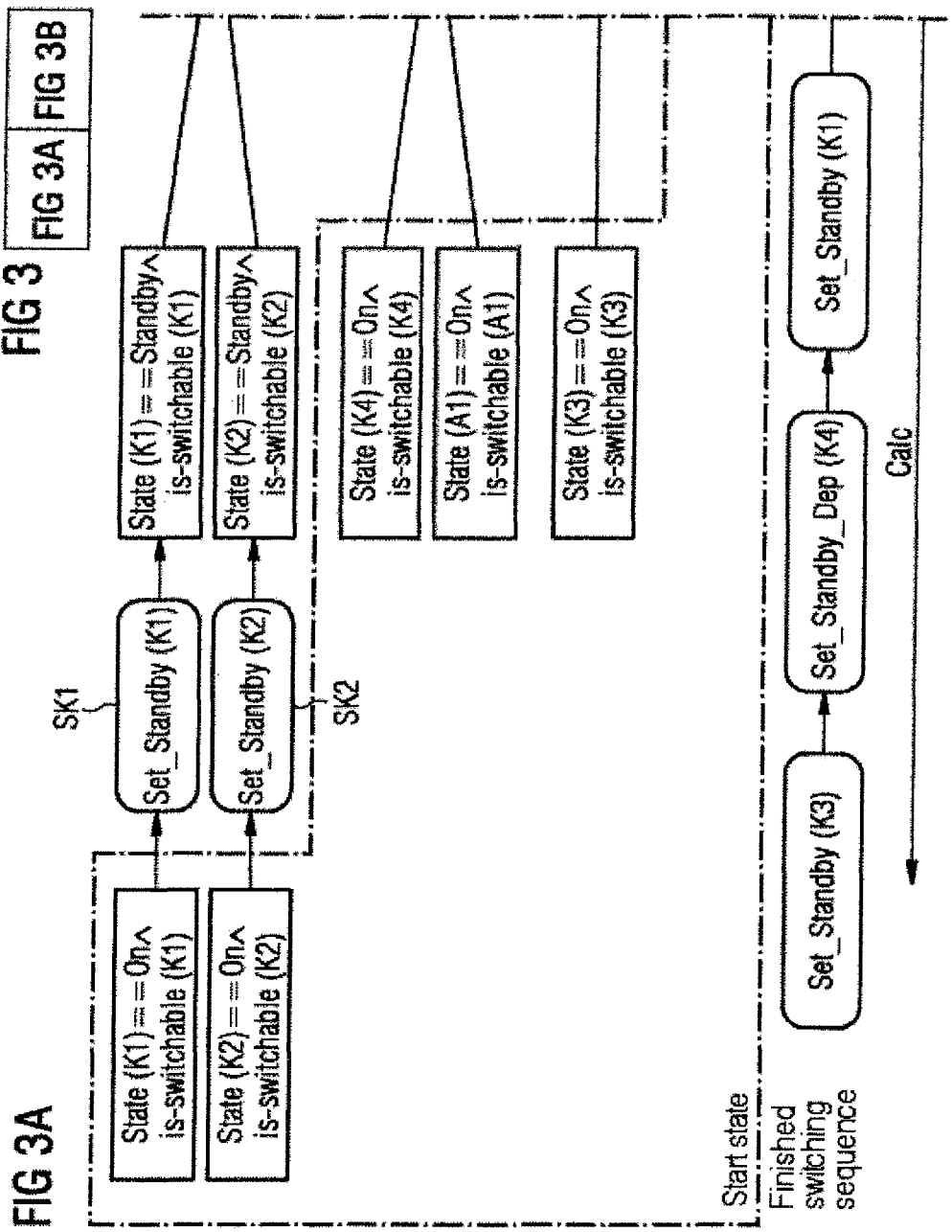

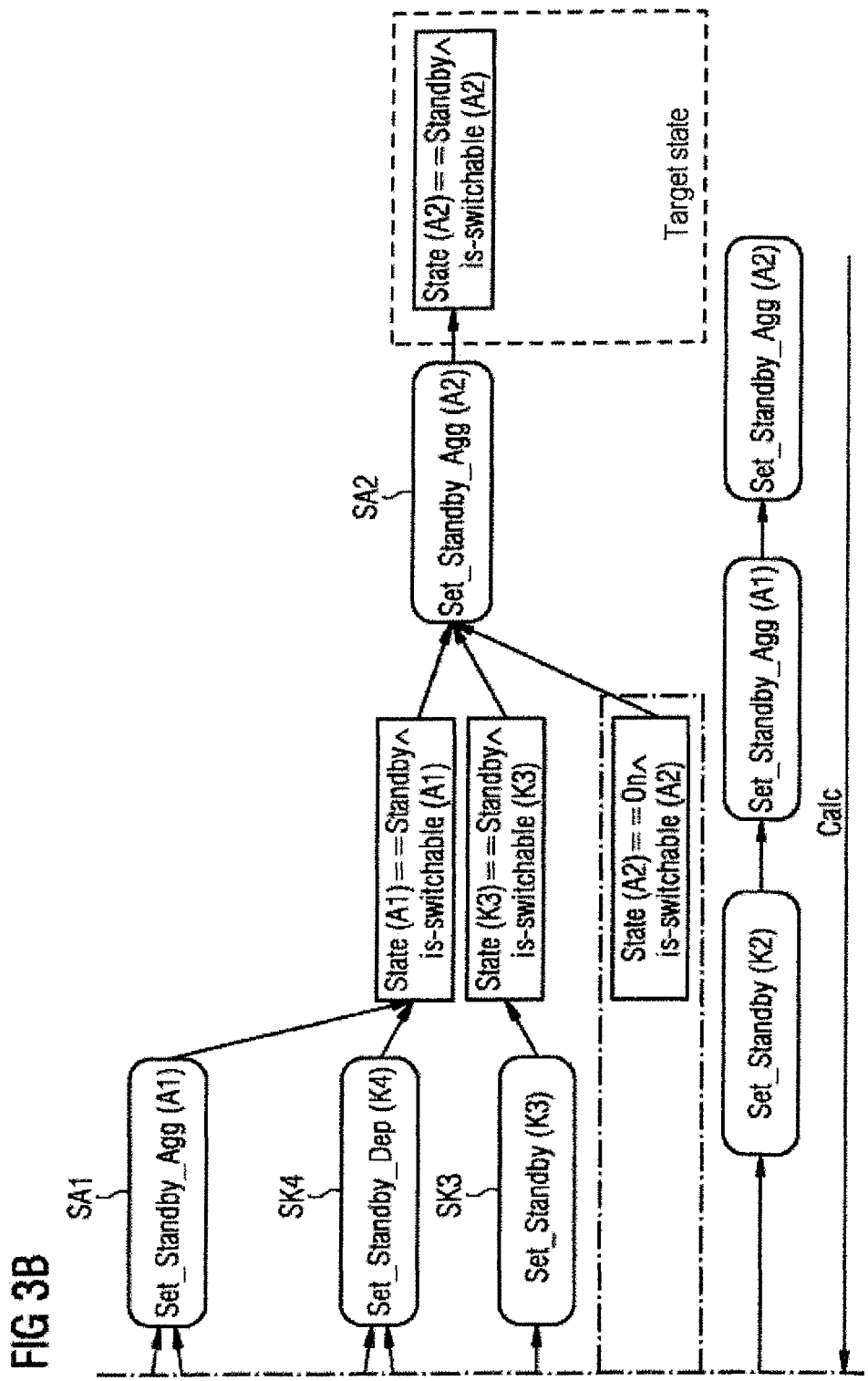

METHOD FOR GENERATING A SWITCHING SEQUENCE IN AN INDUSTRIAL SYSTEM, AND DEVICE

CROSS-REFERENCES TO RELATED APPLICATIONS

This application is the U.S. National Stage of International Application No. PCT/EP2015/069175, filed Aug. 20, 2015, which designated the United States and has been published as International Publication No. WO 2017/028931.

BACKGROUND OF THE INVENTION

It may be necessary, for various reasons, such as, for example regulation of breaks, shift planning, faults or cycles in the production process, to temporarily move entire production plants or parts of production plants to a standby state for the purpose of saving energy.

In this case: "standby" refers to a device state, in which at least one function, but not the main function, is fulfilled, in which a significantly reduced energy consumption prevails and the main function can be activated again at any time without preconditions. However, activating and leaving standby states ("switching process") is not instantaneous, that is to say immediate, but instead requires a certain amount of time.

Depending on the degree to which the energy consumption is reduced, several different "depths" of standby state may furthermore exist, which result from the individual nature of the respectively observed plant or sub-plant or components.

On account of the complex design of production plants and the processes executed, the system composed of production plant and functions is dynamic, whereby the temporary movement of entire plants or parts thereof to a standby state requires precise knowledge about properties and relationships of the entities involved on different observation levels (component, unit, sub-plant, etc., in context with process step, sub-process, etc.) with respective dependencies.

Essential variables are the times for reaching standby from the main function and reaching the main function from standby as well as the minimum and maximum dwell time in standby.

Further variables may be plant-structure-specific or process-specific preconditions, which may have priority over the pure time observation. Furthermore, during the switching process, so-called "synchronization states" may be relevant, in which, first of all, dependent entities must have occupied specific states and which must be identified and characterized separately.

Switching processes and their consequences have to be able to be tracked and monitored. Switching processes in plants therefore have to follow specific sequences of switching actions, subsequently also referred to as switching paths, which result on account of features of the entities and the knowledge about the nature of the plant. However, this is subject to changes (for example due to retrofitting) in accordance with the lifecycle thereof, with effects on the validity of the switching paths, which then have to be adjusted. Individual components along the paths are then controlled for moving to a standby state or for reactivation by corresponding technical means, for example by means of PROFIenergy commands.

A prerequisite for the determination and processing of switching paths is a sufficiently complete plant model, which describes the design of a production plant under the following aspects:
hierarchy,
units and individual components and their relationships to one another with respect to production cycles, technical boundary conditions etc.,
state machines, the design of which results from the possible standby states of the entities with respective energy saving, the respectively required switching times and possibly present restrictions of the switching options of the components; these are dependent on the respective components themselves and on their individual interconnections.

Until now, the required "plant switching model" has thus been formed and provided with the further required information manually in a separate engineering step. Although the knowledge about the underlying relationships is then found in the model again, said knowledge is used only manually for determining the restrictions that are to be assumed. The possible switching paths are then determined from said predefined features and characteristic variables and transmitted to a downstream software component for controlling and monitoring the switching processes.

Connections to the plant communication system that are to be parameterized likewise serve for monitoring and controlling the progression along the switching paths.

If there are changes to the plant, the separate plant switching model has to be traced using the relevant information and the switching paths have to be regenerated and implemented manually. This energy-efficiency-related work constitutes additional outlay in the device and in the operation of plants, in terms of both data storage and the working steps.

Nowadays, the necessary information is available in various engineering tools, documents and possibly as knowledge of individuals involved (plant drivers, operators, commissioning engineers) and has to be evaluated manually.

In the following text, known types of dependencies in switching processes for the purpose of changing the energy requirement of an automated machine or plant and the underlying causes are described.

In the following text, "dependency" means that for a specific switching process conditions have to be fulfilled in order for the switching process not to lead to a fault state of the plant or individual components.

1. There are dependencies regarding the ability to reach communication partners: other components must be able to be reached (for example for registering or confirming the ability to reach a "neighboring station", etc.).
Exceptions to this would be
Safety: for an automatic mode, generally all participants in a safety circuit must be able to be reached in order that said safety circuit can be closed.
Mutual registration: plants can be implemented in such a way that a start-up process always leads to a fault (mutual request of both communication partners in the case of not absolutely synchronous start-up). In such a case, automatic acknowledgement of faults may be necessary as a "switching action".

2. There are dependencies on the media supply, ancillary units and/or infrastructure components: plants and/or components can generally only be operated in an expedient manner when the supply with various media is guaranteed to a certain extent. (Cooling water, technical gases, compressed air, etc.). The operation of plants may require secondary processes or infrastructure elements to be present in specific states (for example industrial extractor, room air conditioning systems and lighting are switched on).

3. There are dependencies in the material flow: coupled plants may require upstream or downstream plant parts to be switched on, in particular when the two plant parts are involved in transfer processes. Switching strategies may possibly be derived at the same time from material flow dependencies. In an extreme case, only plant parts through which a part is currently running are always switched on.

4. There are start-up processes: it may be necessary during switch-on to observe chronological orders and possibly temporal boundary conditions when processes require this, such as warming phases, start-up of machine tools, decoupling of switch-on peaks.

5. There are shutdown processes/cycle ends

In this case, there may be process engineering reasons for switch-off chronological orders and follow-up times (for example cooling phases). Working steps are not able to be interrupted arbitrarily, but instead must first be brought to a defined end state (for example a safe state of a machine or plant) (also referred to as "cycle end").

Representatives of the problem solution described above are found, for example, in the Siemens-internal activities such as the prototype implementation of a so-called "energy state controller", which is already known from EP 2726945 A1.

Other patent applications in the context of energy-related switching systems are known, for example:
  a system for automatically creating switching sequences taking into account energy-related threshold values (EP 2798418 A1)
  the initial determination of system parameters by means of automatic iteration of synthetic operating scenarios (EP 2729845 DE)
  a configuration tool for energy behavior of plant components (EP 2729853 A1)
  a switch-off and restart-up concept for plants for increasing energy efficiency, based on autonomous systems (EP 2802947 A1),
and in the context of sequence generation:
  dynamic task flows and generation thereof (WO 2009/021540).

SUMMARY OF THE INVENTION

It is now the object of the invention to specify a method for generating switching sequences that is improved with respect to the already known prior art.

The object is achieved by the subjects claimed in the independent patent claims.

The method generates a switching sequence in an industrial plant comprised of individual components for transferring the entire plant to an energy-saving state, using a state model of the plant with regard to the components and information about a task-specific action schema with regard to the components, using which, in a first step, the state model is supplemented with the task-specific action schemata to form an extended state model and, in a second step, proceeding from a desired target state of the plant is calculated back to a start state in the extended state model in order, in a third step, to generate the switching sequence from the start state to the target state.

Further embodiments of the invention are described in the dependent claims.

The determination of switching paths on the basis of components and their relationships is considered to be a planning problem in a respectively valid state space. Said state space is described by a dynamically changing predicate-logic-based, semantic plant model, which can also grow over the plant life cycle and thus describes the respectively current structural design and manner of functioning (process information) and the states of the plant, and carries along the required information relevant to energy/standby as model information in an integrated manner. Switching-relevant variables, such as, for example, switching times on a unit level, can be derived automatically from the representatives for the individual components in a "model preparation step" and do not need to be populated manually. With the aid of the model, the issue regarding synchronization states on a unit level can likewise be answered in an automated manner by derivation from plant topology and switching times and no longer requires manual intervention.

Switching sequences are composed of switching-task-dependent combinations of specific actions in a specific context; to this end, only those variables that are relevant to the respective task of standby switching are observed.

To this end, so-called action schemata, that is to say application-case-based sets of rules, in the form of model-dependent precondition-effect-descriptions, are used. These comprise a series of preconditions in the form of predicate-logic-based statements on the model and an effect, likewise formulated as a predicate-logic-based statement, for each possible/pre-planned switching action on a component (or else a component type).

Said action schemata also specifies that information that a plant model has to contain in order to be valid as "suitable for energy switching", as in this case. An action schema can be generated automatically from a given semantic model based on classes of elements using knowledge from the metamodel together with the specific plant knowledge.

To this end, for instance, the following start information is required:

The procedures of the respective connected components that are to be provided in accordance with the dependency direction for the semantically underlying relationship types
  partonomy ("is-part-of"/"has-part" relation),
  taxonomy ("is-a" relation) and
  topology ("is-related-to" relation)
provided by the metamodel and to a generally valid dependency relationship ("depends-on" relation), and a prioritization of the relationships for the later observation. The prioritization can simply be based on ranking lists or dependent on time, wherein the possibilities that are valid therefor are described in Allen, James F.: Maintaining Knowledge about Temporal Intervals. In: Communications of the ACM Vol. 26 (1983), No. 11, pp. 832-843.

The procedures can in this case range from a simple switchover of values up to complex time-dependent and monitored operations.

Furthermore, information about characterizing relationships between components in the plant model is required, for example is-part-of or depends-on relations. The basic classes are thus underpinned as a basis for the preconditions, for example as "one class per relationship".

Furthermore, information about the effect on the classes to be achieved overall, said effect being able to be derived automatically from element-related effect representatives, which are described, for example, by Boolean attributes (standby=true), and the information about whether and how the effect can be triggered is required.

Finally, the start state of the model is required, that is to say which initial configuration of the effect representatives is intended to apply.

For the determination of the action schema, the specific plant model is examined using the abovementioned start information and only the actually present relationships are further observed in order to reduce complexity. For the components involved in the relationships, corresponding local preconditions are derived for each relationship using the start state, the effect to be achieved and the provided procedures, said preconditions being subsequently combined to form global preconditions for each action.

Using the actions determined in this way, in the context of the model preparation, said model is then examined to determine whether, for example, effect representatives and variables required for carrying out actions are stored at all involved elements and the model is extended where necessary.

In this case of the model preparation for standby actions, the following approach can be followed in order to store the required information in the model: as soon as a component (or subcomponent) leaves its state of fulfilling the main function due to a standby demand, the superordinate unit (comprised of one or more components) can also no longer fulfil its main function. However, this is still not a compulsory standby state for the unit, but instead constitutes an intermediate state. Said intermediate state is undertaken in the state model of the unit (bottom-up). The switching times and restrictions are determined from said state model and from the relationships described in the plant model: "because component A requires 5 seconds for the transition to the standby state and component B requires 8 seconds, the unit AB requires at least 8 seconds, and because AB can only switch off when the coupling to unit C that needs 11 seconds for the transition to the standby state is terminated, the time for AB increases by at least 3 seconds", etc.

Plant models of this kind with corresponding significance already exist in the context of digital manufacture and production (system) lifecycle management (P(S)LM). "Superimposition" of action schemata thus defines those application-case-based variants that have to be incorporated in the model in order to be able to execute the application cases. Nevertheless, a plant model of this kind can be extended and tested by adding a new aspect, for example safety, with the result that, during model preparation, warnings may possibly be emitted, and that the model does not yet contain the required information at specific desired aspects.

In the case of a desire to execute a switching action described and underpinned in this way on a component/unit/ etc. at the current time, a check is made, proceeding from the desired effect, as to which preconditions have to be satisfied in order for the action to be able to be carried out ("backward search" with search space limiting). The observation of said preconditions then supplies those switching actions that have to be carried out, in order to be able to regard the preconditions as satisfied by means of the effects thereof. Said search is continued until the current overall state is reached. The set of switching actions determined thereby is converted to a clear sequence of switching actions in a criteria-controlled linearization step, since theoretically alternative switching orders are possible. Said sequence constitutes the switching path to be obeyed. Said switching path contains, from the plant model, the control and monitoring signals to the plant that are to be obeyed in the respective steps.

For obeying the generated switching path, said signals are transmitted to an execution entity ("engine") that handles the sequence in a similar manner to a program script, monitors the progress of individual actions and provides feedback to the calling system. This signals whether the switching actions have been able to be executed, and if not, that an appropriate remedial measure or workaround ought to be determined, in each case taking into account the current plant model that changes at any time and plant variables/ process values.

BRIEF DESCRIPTION OF THE DRAWING

The invention is further explained in the following text with reference to figures, in which FIG. 3 shows an illustration of procedures of step 1 and step 2 of the calculation.

DETAILED DESCRIPTION OF PREFERRED EMBODIMENTS

Figure 1:
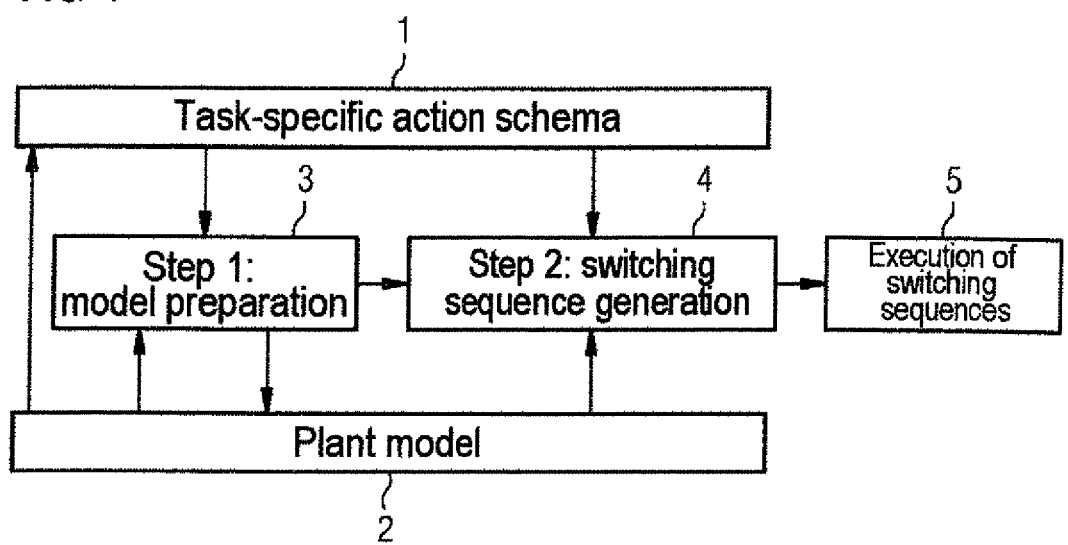
FIG. 1 shows the interaction of the agents involved for the generation of switching sequences.

FIG. 1 very generally shows the interaction of the agents for switching sequence generation. The underlying plant model 2 can be seen at the bottom and the task-specific action schema for the plant 1 can be seen at the top. In step 1, the two pieces of information are linked to one another, for the purpose of model preparation 3. Step 2 then takes place, in which the switching sequence is generated 4 based on the information generated previously. The switching sequence thus generated is transferred 5 to the plant or the components thereof for execution.

In accordance with the invention, energy-related relationships between components can thus be derived and supplemented automatically from available knowledge successively during the plant life cycle and depending on available knowledge and do not, as previously, have to be manually installed with full a priori knowledge of the plant.

In the following text, examples of relationships in the form of dependencies are specified.

Sources in which information regarding dependencies are be stored may be, for example:

With respect to dependencies regarding the ability to reach communication partners: safety circuits are generally described in an E plan. General communication relations can often only be comprehended nowadays with difficulty (they may be part of SW documentation). In a future plant model, "logical" communication relations should nevertheless be mapped. Communication relations of this kind are already stored in interchange formats for engineering tools today (for example AutomationML).

With respect to media supply and subunits: plans of the media supply, piping and instrumentation diagrams, requests/conditions in automation programs, or in-plant and legal operating regulations for plants.

With respect to material flow: material flow simulations (for example PlantSimulation), requests/conditions in automation programs.

With respect to start-up processes: process descriptions and simulations, operating regulations for machines and plants, requests/conditions in automation programs.

With respect to shutdown processes/cycle ends: process descriptions and simulations, material flow simulations (for example PlantSimulation), operating regulations for machines and plants, requests/conditions in automation programs.

In accordance with the invention, the user can now also use incomplete and/or changing models. Models that are already available, as are known, for example, in the P(S)LM field, can at the same time be further used and they can be superimposed upon.

If a model changes at runtime, for example on account of plant modifications or configurations, said changes can automatically be taken into account and the relevant switching paths are adjusted.

Changes in the plant dynamics, for example in the case of shifts in the production process, faults or shift plan changes, can likewise be taken into account adaptively without additional configuration steps.

A single central logic may be used homogeneously for a plurality of heterogeneous application cases, based on a dedicated adjustment by the associated application-case-specific action schemata. This leads to a simplified system architecture, since only one single model containing knowledge about the various application cases to be operated and a single algorithmic approach have to be observed.

The use of a backward search permits fine-grained, adaptive dynamization of the switching path determination even at runtime, even while a switching path execution has already begun (dynamic search for workaround), and this even in the case of a modification of the model itself during running switching path execution.

The addition of new functionalities in the context of energy management to systems in the field of digital manufacture/P(S)LM is simplified, just as the application-case-overarching engineering is simplified. Furthermore, it is possible to respond to questions about the forecasted behavior of plants in the case of various switching actions even during engineering, since simulation of the plant behavior can be superimposed directly on the generated switching sequences.

Furthermore, integrated combinations of application cases are also possible: for instance, in the event of a switching fault arising on the switching path, a suitable explanation of possible causes can be determined and remedial measures in the form of repair instructions can be supplied to the user automatically and dynamically. The foundation for this is the application of the abovementioned advantages, in particular the automatic action schema determination for switching actions, together with the nowadays already existing properties of the generation of interactive repair instructions, which nowadays already control dynamic, adaptive sequence generation.

Depending on the configuration of the metamodel, which may also take place at arbitrary times, it is possible to incorporate further aspects in the observation retrospectively. For example, safety requirements can also be taken into account as desired and therefore indications about whether the specific plant model satisfies said additional requirements and which generated switching paths are to be handled with care are automatically supplied.

The method described here is used to aid energy switching concepts and control systems not being considered as "accompanying" systems, but instead experiencing better integration and information consistency in the normal scope of functioning of plants and software landscapes (keywords: P(S)LM, MES (manufacturing execution system), ERP (enterprise resource planning)), which are already based on semantic plant models.

Figure 2:
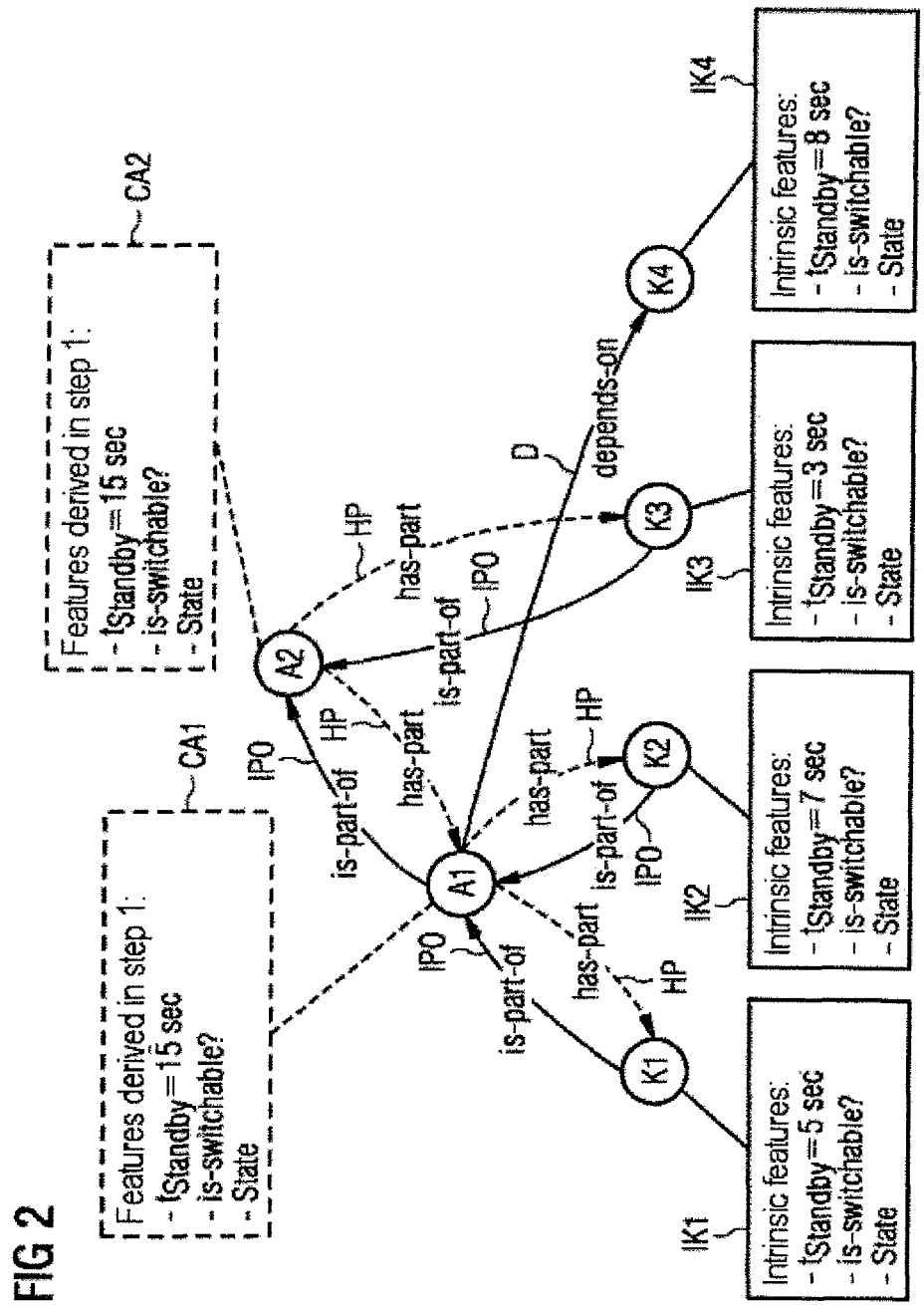
FIG. 2 shows an example of a plant model with start contents and derived contents.

The following example in FIG. 2 illustrates the functional principle of the automatic generation of switching sequences. Four components K1, K2, K3 and K4 are given, which each have two switchable states "on" (productive state) and "standby". In each case, intrinsic features are known for these components, namely the time $t_{Standby}$ required to change from the state "on" to "standby" ("time_to_standby"), "is-switchable" as predicate, which indicates whether a switchover is currently possible (in the sense of the functionality "can be switched_to_standby" in this example), "state" as function, which requests/supplies or sets the current state (switchover). In this example, this should serve as a simplification of a predicate "is-standby" and the handling thereof.

As relationships between the components, one plant model describes that K1 and K2 together are part of a unit component A1. The fact that A1 is a unit can be derived from the participation of A1 in "is-part-of" relations. A1 is in turn part of a unit component A2, of which the component K3 is a further constituent.

Unit components A1 and A2, as derived or defined instances of "system", therefore map a complex unit. The ability of the unit component A1 to switch is dependent on the component K4 belonging to a unit situated outside said unit boundary, for example at another unit not described here.

The resulting model structure serving as a basis for the further process is illustrated in FIG. 2 by the further nodes and solid edges ("is-part-of" as "partonomy coupling" and "depends-on" as "component-system coupling").

Furthermore, the following exemplary chronological procedures for the fundamental semantic relationships and the following rules for switching actions are defined:

Rule 1: when "has-part" relations occur, all relation partners should be switched simultaneously:

$$\forall X, Y: \text{has-part } (X, Y) \rightarrow \text{starts-with } (X, Y).$$

The desired switching result should be present for X after the presence of the switching result for Y.

Rule 2: when "is-a" relations occur, no switching action should be triggered (all taxonomy relationships neutral).

Rule 3: when "is-related-to" relations occur, first the original partner then the target partner should be switched:

$$\forall X, Y: \text{is-related-to } (X, Y) \rightarrow \text{before } (X, Y).$$

Rule 4: when "depends-on" relations occur, first the target partner and only afterwards should the original partner be switched:

$$\forall X, Y: \text{depends-on } (X, Y) \rightarrow \text{after } (X, Y).$$

The execution of the switching actions is subsequently monitored in accordance with said regulations. In this case, "has-part" has been selected intentionally for said rules, since this can be derived as the inverse from the modeled "is-part-of". Furthermore, in this example, the prioritization of the relationships is defined in such a way that "depends-on" leads to priority treatment of "is-part-of", that is to say "before (depends-on, is-part-of)" as an application-case-specific criterion.

Candidates are automatically identified on this basis for R1 and R4 only, using the metamodel in the plant model, since only the referenced relationships thereof are modeled. From these candidates, only three classes of entities are in turn identified as present and thus relevant for the further observation:

K1. Entities consisting of further entities, that is to say those for which only one relationship "is-part-of" or inversely "has-part" holds true:

has-part $(X, Y)^\wedge \neg$depends-on $(X, Y)$.

K2. Entities consisting of further entities and at the same time still having dependencies on further entities, that is to say those for which both "is-part-of"/"has-part" and a "depends-on" relationship holds true:

has-part (X, Y)^depends-on (X, Z).

K3. Entities that cannot be subdivided further and also do not have any dependencies, that is to say those for which neither "is-part-of" nor "depends-on" hold true:

¬has-part (X, Y)^¬depends-on (X, Y).

Since "has-part (X, Y)" and "depends-on (X, Y)" are different in accordance with the relationship prioritization, it can now be stated that three different preconditions have to be described automatically, namely for K1, K3 and the "depends-on" part of K2, since satisfaction of said preconditions permits the subsequent satisfaction of "has-part". Using the start state of the model and the effect specification "standby:=true" for all entities, that is to say "state (X):= true", the final result is the action schema with the context-based switching options ("switching effect can occur when precondition is satisfied") for the coordinated switching of all entities, that is to say components and units, from the "on" state to the "standby" state. The preconditions of the respective switching actions in this case contain those predicates that the plant model has to be able to operate basically for determining the switching sequence.

K1: intrinsic features:
$t_{Standby}$=5 sec
is-switchable?
state

K2: intrinsic features:
$t_{Standby}$=7 sec
is-switchable?
state

K3: intrinsic features:
$t_{Standby}$=3 sec
is-switchable?
state

K4: intrinsic features:
$t_{Standby}$=8 sec
is-switchable?
state
Unit boundary

A1: features derived in step 1:
$t_{Standby}$=15 sec
is-switchable?
state

A2: features derived in step 1:
$t_{Standby}$=15 sec
is-switchable?
state

In this case, the following holds true: $t_{Standby}$ is the time required for switching from the "on" state to the "standby" state.

"Is-switchable": indicates whether the entity is functional (switchable).

"State": is a predicate (function) that supplies or sets the current state {on, standby} of the entity.

Elements and information derived or supplemented by applying step 1 are illustrated using dashed lines.

TABLE

Example action schema for switching all entities to standby

| Action | Precondition | Effect |
|---|---|---|
| Set_Standby (X: Entity) | State (X) ≠ Standby ∧ is-switchable (X) ∧ ¬(depends-on (X, Y) ∧ Y: Entity ∧ ¬(has-part (X, Y) ∧ Y: Entity) | State (X) := Standby |
| Set_Standby_Dep (X: Entity) | depends-on (Y, X) ∧ State (X) ≠ Standby ∧ is-switchable (X) ∧ Y: Entity ∧ state (Y) == On | State (X) := Standby |
| Set_Standby_Agg (X: Entity) | has-part (X, Y) ∧ State (X) ≠ Standby ∧ is-switchable (X) ∧ Y: Entity ∧ State (Y) == Standby | State (X) := Standby |

The application of step 1 supplements the plant model on the one hand on the unit level with features that can be derived from the components using coupling information and that the user therefore does not have to explicitly specify himself. On the other hand, step 1 also checks and uses relationship information, which is required by the action schema and which is valid based on semantic definitions in the metamodel with respect to the bidirectionality of couplings ("inverse").

As a result of step 1, the plant model is subsequently represented as in FIG. 2 with the extended contents or knowledge illustrated using dashed lines.

Step 2 can now be executed on this extended plant model and therein the required switching actions can be determined and the finished switching sequence can be generated, calc with the aid of the action schema. Said process with its (intermediate) results is illustrated in FIG. 3. In this case, the following holds true as start state (outlined in the map):

∀X: state(X)==On^is-switchable(X).

The condition X: Entity has been omitted here for reasons of simplification. With the specification that the following is intended to hold true as target state for A2 and hence for all connected components and units:

State(A2)==Standby, those actions that satisfy said condition (backward search while applying the precondition-effect-model) are now searched using the possible actions. The resulting graph is then linearized, wherein, in this example, the following sequence is intended to hold true as linearization criteria (application-case-specific configuration):

1. follow the semantics of the coupling predicates concerned and the resulting prioritization in the event of multiple actions on identical entities (in this example this means that in unit A1 the actions of "depends-on" have to be fully processed before those of "has-part").
2. time coordination of actions within the action set: actions having a shorter $t_{Standby}$ are executed first.

Subject to these specifications, step 2 supplies the switching sequence illustrated in FIG. 3. Said switching sequence can then be transmitted to the instance (engine) for executing switching sequences.

Using this functional principle also illustrates the fact that an a priori complete plant and switching model is not required for this stepwise determination, but instead, as far as possible, actions and sequences can be determined and possibly a reminder can be sent about missing information using the respective available knowledge.

When switching requirements that are to be requested dynamically change, renewed switching sequence determination can be initiated during the execution of switching sequences in the real plant (for example from "is-switchable (X)" to "¬is-switchable (X)" on account of a technical problem), which determination then leads, where possible, to a switching sequence other than the original one, and changes can be made dynamically to the plant model and/or action schema and the switching sequence determination can thus immediately be adapted automatically to the new conditions.

The invention claimed is:

1. A method for generating a switching sequence in an industrial plant which includes components for transferring the plant to an energy-saving state, said method comprising:
   using a state model of the plant with regard to the components and information about a task-specific action schema in form of application-case-based sets of rules composed of model-dependent precondition-effect-descriptions with regard to the components;
   determining an extended state model by supplementing the state model with the task-specific action schema using switching-relevant variables;
   back-calculating in the extended state model from a desired target state of the plant to a start state based on the application-case-based sets of rules;
   generating the switching sequence from a start state to the desired target state based on the back-calculation; and
   executing the generated switching sequence.

2. The method of claim 1, wherein the state model of the plant takes into account a unit comprised of at least one of the components, with a task-specific action schemata existing at a level of the unit.

3. The method of claim 2, wherein knowledge of a state of the least one component of the unit is sufficient for determination of a state of the unit.

4. The method of claim 1, wherein only a relationship that is actually present in the plant is observed for determination of the extended state model.

5. The method of claim 1, further comprising regenerating the switching sequence when the state model is changed.

6. The method of claim 1, further comprising regenerating the switching sequence when the task-specific action schema is changed.

7. The method of claim 1, further comprising simulating a behavior of the plant with the aid of the generated switching sequence.

8. The method of claim 1, further comprising supplying a fault analysis to a user when a switching fault occurs on a switching path.

9. The method of claim 1, further comprising taking further aspects into account in the extended state model, said further aspects not being required for the execution of a task.

10. An apparatus for generating a switching sequence in an industrial plant which includes components for transferring the plant to an energy-saving state, said apparatus being configured to:
    use a state model of the plant with regard to the components and information about a task-specific action schema in form of application-case-based sets of rules composed of model-dependent precondition-effect-descriptions with regard to the components;
    determine an extended state model by supplementing the state model with the task-specific action schema using switching-relevant variables;
    back-calculate in the extended state model from a desired target state of the plant to a start state based on the application-case-based sets of rules;
    generate the switching sequence from a start state to the desired target state based on the back-calculation; and
    execute the generated switching sequence.

* * * * *